(12) United States Patent
Shives et al.

(10) Patent No.: US 9,260,064 B2
(45) Date of Patent: Feb. 16, 2016

(54) HEAT REFLECTIVE MATERIAL

(71) Applicants: Honda Motor Company, Ltd., Tokyo (JP); Lord Corporation, Cary, NC (US)

(72) Inventors: Andrew B. Shives, Dublin, OH (US); Negar B. Gilsinger, Marysville, OH (US); Michael A. Baumbarger, Marysville, OH (US); Rebecca S. Cowles, Wattsburg, PA (US); Daniel E. Adam, Howell, MI (US)

(73) Assignees: Honda Motor Co., Ltd., Tokyo (JP); Lord Corporation, Cary, NC (US)

( * ) Notice: Subject to any disclaimer, the term of this patent is extended or adjusted under 35 U.S.C. 154(b) by 0 days.

(21) Appl. No.: 13/689,497

(22) Filed: Nov. 29, 2012

(65) Prior Publication Data
US 2013/0134735 A1 May 30, 2013

Related U.S. Application Data

(60) Provisional application No. 61/565,183, filed on Nov. 30, 2011.

(51) Int. Cl.
*B60R 13/00* (2006.01)
*B60R 13/08* (2006.01)
(Continued)

(52) U.S. Cl.
CPC .............. *B60R 13/0815* (2013.01); *B32B 3/00* (2013.01); *B32B 27/18* (2013.01); *B32B 33/00* (2013.01);
(Continued)

(58) Field of Classification Search
CPC .... B32B 2605/003; B32B 27/18; B32B 3/00; B32B 33/00; B32B 2255/26; B32B 2307/102; B32B 2307/304; B60R 13/0815; B60R 13/0838; B60R 13/0846; B60R 13/0876
USPC .......... 181/294, 286, 284, 290, 211; 296/39.3
See application file for complete search history.

(56) References Cited

U.S. PATENT DOCUMENTS

| 3,552,370 A | 1/1971 | Briggs |
| 5,530,213 A | 6/1996 | Hartsock et al. |

(Continued)

FOREIGN PATENT DOCUMENTS

| CN | 1809871 A | 7/2006 |
| EP | 0384995 A1 | 9/1990 |

(Continued)

OTHER PUBLICATIONS

International Search Report and Written Opinion of the International Searching Authority, issued Feb. 11, 2013, in International Application No. PCT/US12/67320, 43 pages in its entirety.

(Continued)

*Primary Examiner* — Joseph D Pape
*Assistant Examiner* — Dana Ivey
(74) *Attorney, Agent, or Firm* — Ulmer & Berne LLP

(57) ABSTRACT

An assembly for managing heat and noise generated by an engine comprises a dash panel, an acoustic absorbing layer, a scrim, and a heat reflective coating. The acoustic absorbing layer comprises a plurality of fibers secure in a resin, where the acoustic absorbing layer is positioned proximate to the dash panel. The scrim is positioned proximate to the acoustic absorbing layer. The heat reflective coating comprises a polymer material and heat reflecting additives dispersed in the polymer material. The heat reflective coating is applied to the scrim as a solution of the polymer material and heat reflecting additives.

15 Claims, 14 Drawing Sheets

(51) Int. Cl.
*B32B 27/18* (2006.01)
*B32B 33/00* (2006.01)
*B32B 3/00* (2006.01)

(52) U.S. Cl.
CPC ......... *B60R 13/0838* (2013.01); *B60R 13/0846* (2013.01); *B60R 13/0876* (2013.01); *B32B 2255/26* (2013.01); *B32B 2307/102* (2013.01); *B32B 2307/304* (2013.01); *B32B 2605/003* (2013.01)

(56) References Cited

U.S. PATENT DOCUMENTS

| | | | |
|---|---|---|---|
| 5,678,369 | A | 10/1997 | Ishikawa et al. |
| 6,082,444 | A | 7/2000 | Harada et al. |
| 6,305,494 | B1 * | 10/2001 | Pfaffelhuber et al. ........ 181/286 |
| 6,777,026 | B2 | 8/2004 | Halladay et al. |
| 6,966,402 | B2 * | 11/2005 | Matias et al. ................. 181/290 |
| 7,163,370 | B2 | 1/2007 | Kokusho |
| 7,368,150 | B2 | 5/2008 | Pritchett |
| 7,763,350 | B2 | 7/2010 | Desi et al. |
| 2004/0060609 | A1 | 4/2004 | Fatato et al. |
| 2005/0255318 | A1 | 11/2005 | Czerny |
| 2009/0197044 | A1 | 8/2009 | Plelzer et al. |
| 2010/0066121 | A1 | 3/2010 | Gross |

FOREIGN PATENT DOCUMENTS

| | | |
|---|---|---|
| EP | 1431126 A1 | 6/2004 |
| EP | 2 502 788 A1 | 9/2012 |
| EP | 2 503 040 A1 | 9/2012 |
| JP | 2000-34938 A | 2/2000 |
| JP | 2006-500245 A | 1/2006 |
| JP | 2013-36383 A | 2/2013 |
| WO | 03021096 A1 | 3/2003 |
| WO | 2004026788 A1 | 4/2004 |
| WO | 2007109533 A2 | 9/2007 |
| WO | 2007134391 A1 | 11/2007 |

OTHER PUBLICATIONS

Hasegawa, Daisuke; Office Action issued in Japanese Patent Application No. 2014-544927; dated May 19, 2015; 14 pages, including English translation.

Yang, Rui; Office Action issued in Chinese Patent Application No. 201280068499.9; issued on Apr. 17, 2015; 27 pages, including English translation.

Matos Gonçalves, M.; Extended European Search Report, including Supplementary Search Report and European Search Opinion, issued in European Patent Application No. 12853128.2; dated Oct. 7, 2015; 10 pages.

* cited by examiner

HEAT REFLECTIVE MATERIAL

CROSS-REFERENCE TO RELATED APPLICATIONS

This application claims priority to and the full benefit of U.S. Provisional Patent Application Ser. No. 61/565,183 filed Nov. 30, 2011, and titled "Heat Reflective Coating," which is incorporated by reference as if fully rewritten herein.

TECHNICAL FIELD

This disclosure relates generally to a heat reflective material and, more particularly, to a heat reflective material for insulation.

BACKGROUND

Many conventional vehicles are powered by an internal combustion engine. Examples of such vehicles include automobiles, trucks, buses, off-road vehicles, boats, personal watercrafts, recreational vehicles, and aircrafts. Such internal combustion engines are typically positioned in a vehicle's engine compartment. Heat and noise generated by internal combustion engines can radiate outside the engine compartment and affect other components of the vehicle or passengers seated in the vehicle. Engine compartments can be equipped with materials or elements designed to absorb noise or deflect heat generated by the engine. For example, a vehicle compartment can include acoustic insulating material that absorbs noises generated by the engine to provide a quieter environment in and around the vehicle. Engine compartments can also be equipped with heat baffles that are positioned to deflect heat away from the passenger compartment to provide a more comfortable environment in the passenger compartment.

SUMMARY

In accordance with one embodiment, an assembly for managing heat and noise generated by an engine comprises an acoustic absorbing layer and a heat reflective coating secured to the acoustic absorbing layer. The heat reflective layer comprises heat reflecting additives deposited in a polymer material, which is formed with a plurality of channels passing through the polymer material.

In accordance with another embodiment, an assembly for a passenger vehicle that includes a passenger compartment for absorbing noise and deflecting heat generated by an engine away from the passenger compartment comprises a dash panel, an acoustic absorbing layer, a scrim, and a heat reflective coating. The acoustic absorbing layer comprises a plurality of fibers secure in a resin, where the acoustic absorbing layer is positioned proximate to the dash panel. The scrim is positioned proximate to the acoustic absorbing layer. The heat reflective coating comprises a polymer material and heat reflecting additives dispersed in the polymer material. The heat reflective coating is applied to the scrim as a solution of the polymer material and heat reflecting additives.

In accordance with another embodiment, an insulation assembly includes an acoustic insulator and a heat reflective material. The acoustic insulator has a first side and a second side, and the acoustic insulator includes non-woven fibers defining tortuous pathways through the acoustic insulator. The pathways are in fluid communication with a plurality of openings on the first side of the acoustic insulator. The heat reflective material is secured to at least a portion of the first side of the acoustic insulator without sealing all of the openings.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

The apparatus and methods disclosed in this document are described in detail by way of examples and with reference to FIGS. 1-29. Unless otherwise specified, like numbers in FIGS. 1-27 indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatus and methods for a heat reflective material are hereinafter disclosed and described in detail with reference made to FIGS. 1-29.

Figure 1:
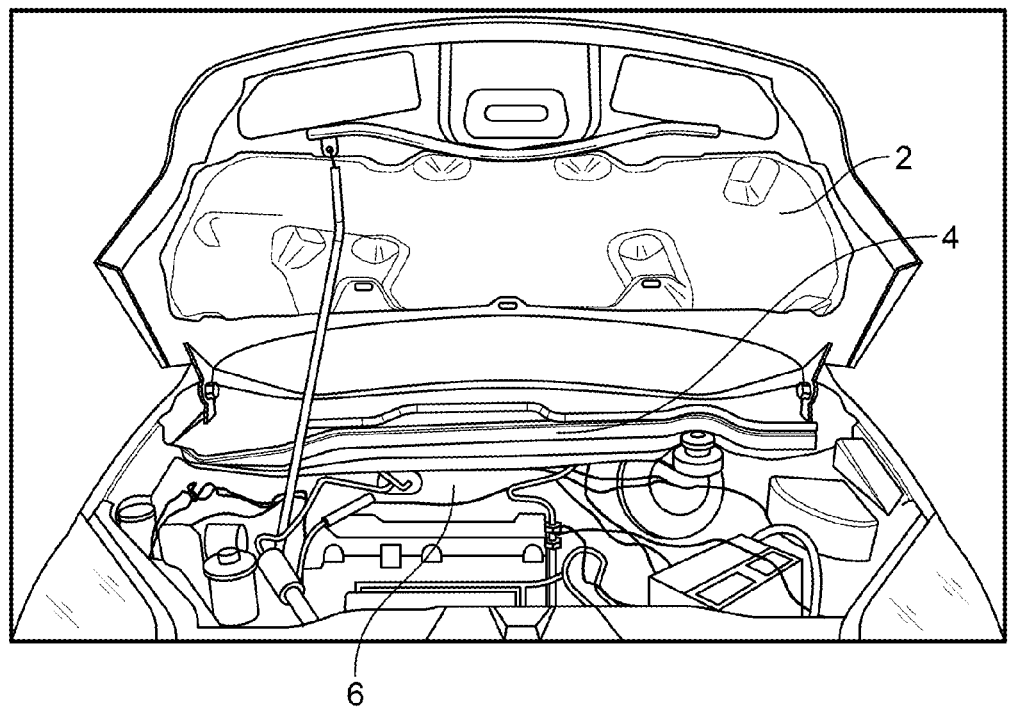
FIG. 1 is a schematic view depicting a vehicle with acoustic insulators positioned in the engine compartment of a vehicle.
Figure 2:
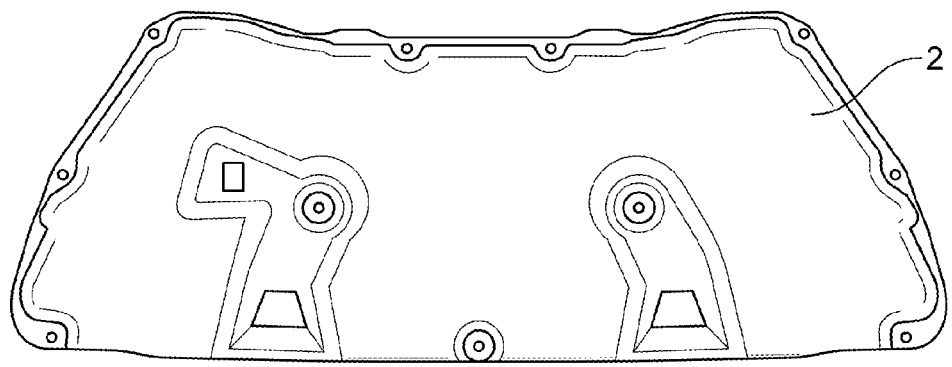
FIG. 2 is a schematic view depicting a hood acoustic insulator.
Figure 3:
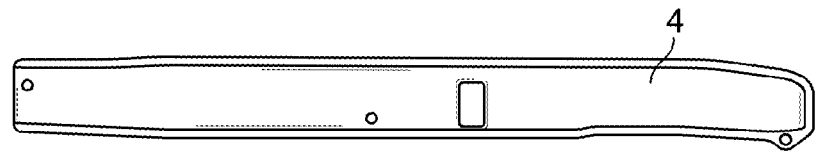
FIG. 3 is a schematic view depicting an upper dash upper acoustic insulator.
Figure 4:
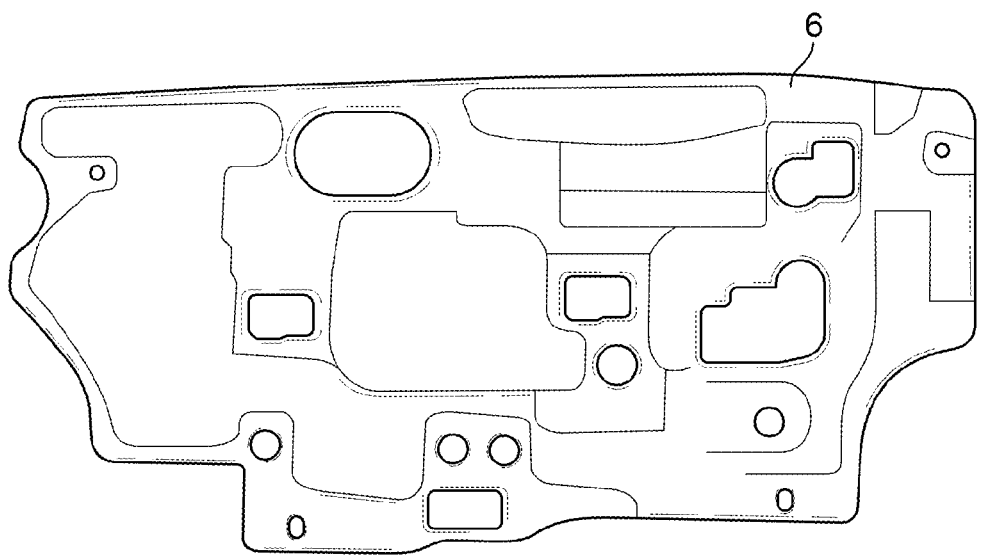
FIG. 4 is a schematic view of a lower dash acoustic insulator.

In a vehicle such as a passenger automobile, materials suitable for absorbing acoustic energy and materials suitable for reflecting thermal radiation can be positioned between an internal combustion engine of the vehicle and a passenger compartment of the vehicle to manage the heat and noise generated by the engine. For example, as illustrated in FIG. 1, a hood acoustic insulator 2 can be secured to the underside of the hood of a vehicle, an upper dash acoustic insulator 4 can be secured to a wall separating the engine compartment from the passenger compartment, and a lower dash acoustic insulator 6 can be secured to the wall separating the engine compartment from the passenger compartment. The hood acoustic insulator 2 is further illustrated in FIG. 2, the upper dash acoustic insulator 4 is further illustrated in FIG. 3, and the lower dash acoustic insulator 6 is further illustrated in FIG. 4. Such insulators 2, 4, 6 can be further arranged or configured to reflect heat to form heat and noise management assemblies.

Figure 5:
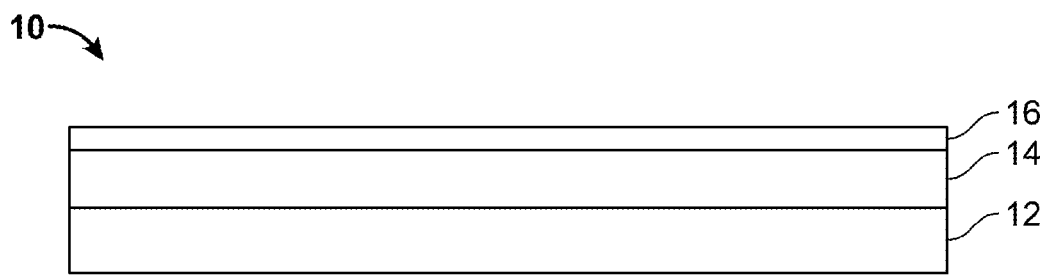
FIG. 5 is an elevational schematic view depicting a heat and noise management assembly in accordance with one embodiment.

An exemplary embodiment of a heat and noise management assembly 10 is schematically illustrated in FIG. 5. The heat and noise management assembly 10 of FIG. 5 can be provided on a substrate 12 such as a dash panel (hereinafter referred to as "the dash panel 12"), and include an acoustic absorbing layer 14 and a heat reflective material 16. The dash panel 12 can be a component of a vehicle dashboard and can be positioned at the interface of an engine compartment and the passenger compartment.

Figure 6:
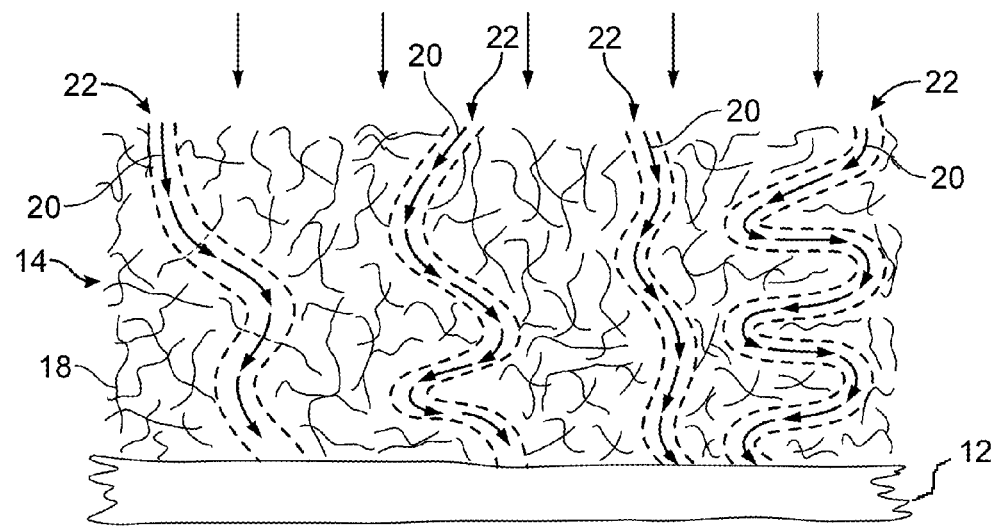
FIG. 6 is a schematic view depicting an acoustic absorbing layer and substrate of a noise management assembly in accordance with one embodiment.

The acoustic absorbing layer 14 can be arranged to absorb noise and other acoustic energy generated by the engine of the vehicle. Generally, the acoustic absorbing layer 14 can be arranged as a porous body capable of allowing sound to enter the body and be absorbed therein. Without being limited to a particular theory, it will be understood that such porous bodies can include good sound absorbing properties because sound waves are able to enter the body where such sound waves are absorbed. One non-limiting example of an acoustic absorbing layer 14 is schematically illustrated in FIG. 6. In the example of FIG. 6, a plurality of fibers 18 form a non-woven fiber acoustic absorbing layer 14. The plurality of fibers 18 form a plurality of tortuous pathways 20 (represented in FIG. 6 by dashed lines setting off the pathways 20) extending throughout the body of the acoustic absorbing layer 14. Sound waves (represented by arrows) enter the pathways 20 via one or more pathway openings 22 in the body of the acoustic absorbing layer 14. As the sound waves travel through the pathways 20, the sound waves are absorbed by the plurality of fibers 18. Although tortuous pathways 20 are illustrated in FIG. 6 using discrete dashed lines, it will be understood by those of ordinary skill in the art that by its very nature, a porous body of an acoustic absorbing layer 14 formed by a plurality of fibers 18 will provide numerous intertwining and intersection pathways 20 that can accommodate the movement, dampening, and/or absorption of sound waves passing through the acoustic absorbing layer 14.

Any sealing or closure of all of the pathway openings 22 could inhibit the ability of sound waves to enter or otherwise travel through the pathways 20 of the acoustic absorbing layer 14, thereby diminishing the sound absorbing effectiveness of the acoustic absorbing layer 14. Although described herein with respect to fiber based acoustic absorbing layers 14, it is to be understood that the present disclosure is not limited to such. For example, open cell foams can also provide tortuous pathways 20 where sound is dampened and/or absorbed by elastomeric properties of the foam.

The acoustic absorbing layer 14 can comprise fibers 18 bound together in or by a resin in a non-woven or woven configuration. Fibers 18 used in forming the acoustic absorbing layer 14 can include natural or synthetic fibers and can be made from recycled materials. Examples of fibers 18 that can be used to form the acoustic absorbing layer 14 include, but are not limited to, glass, fiberglass, wool, cotton, asbestos, graphite, carbon, various ceramic, various polymer materials such as nylon, polyester, rayon, and polypropylene, and combinations thereof. In one non-limiting example, such fibers, or combinations of such fibrous materials, can be bound together by a resin to form the acoustic absorbing layer 14. The resin can be a thermoset or a thermoplastic resin. In one non-limiting example, the resin is a phenolic resin. In another non-limiting example, the resin can be an epoxy that is combined with a hardener to bind together fibers 18 to form the acoustic absorbing layer 14. Other additives including, but not limited to, a flame retarding additive, oil repellants, water repellants, biocides, and mixtures thereof can further be added to the resin prior to, during, or after formation of the acoustic absorbing layer 14. An adhesive, hot melt, ultrasonic welding, heat staking, clipping mechanism, or other suitable securing method can be arranged to generally secure the acoustic absorbing layer 14 to the dash panel 12. The acoustic absorbing layer 14 may be mechanically treated before or after application of the heat reflective material 16. In a non-limiting example, the acoustic absorbing layer 14 may be needle-punched.

Figure 7:
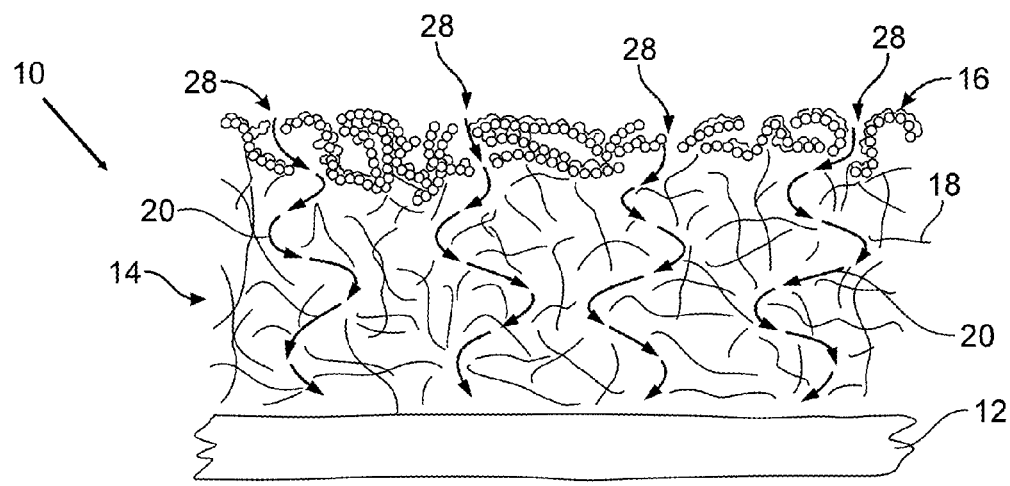
FIG. 7 is a schematic view depicting a noise management assembly in accordance with one embodiment.
Figure 8:
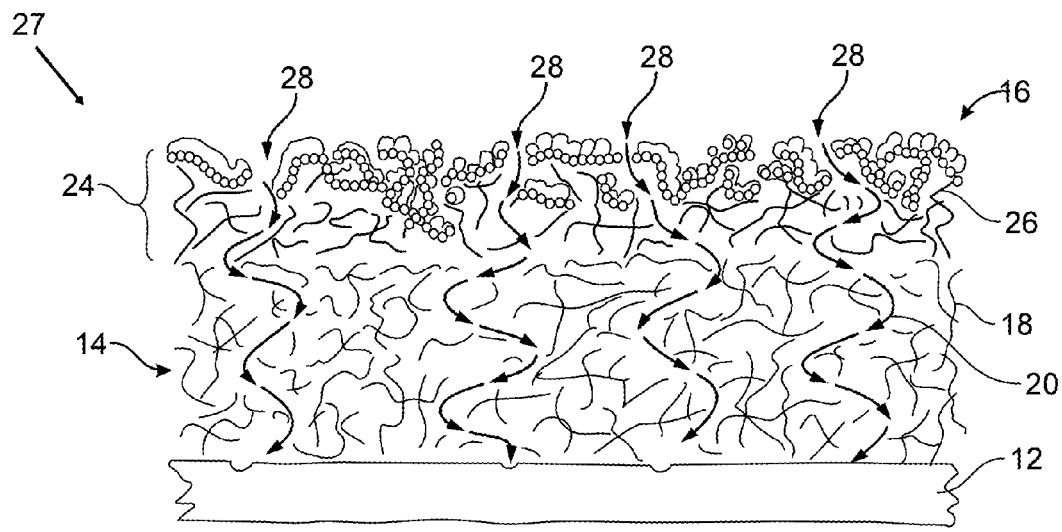
FIG. 8 is a schematic view depicting a noise management assembly in accordance with one embodiment.
Figure 9:
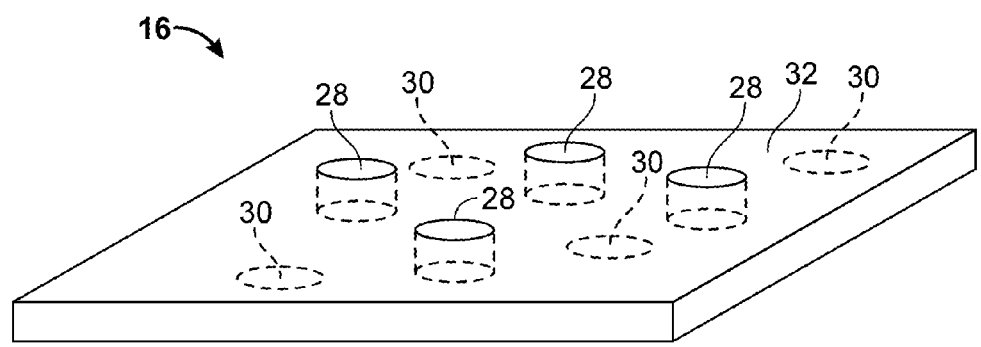
FIG. 9 is a perspective schematic view depicting a heat reflective coating of the heat and noise management assembly of FIG. 5.
Figure 10:
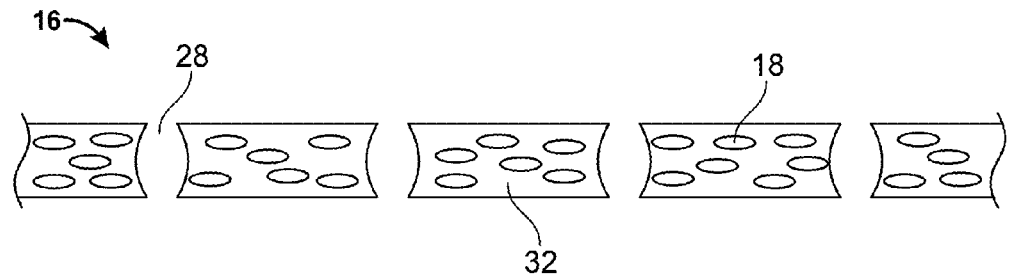
FIG. 10 is a cross-sectional schematic view depicting the heat reflective coating of the heat and noise management assembly of FIG. 5.

As shown in FIG. 7, in one example, the heat reflective material 16 can be applied to the acoustic absorbing layer 14 to form a heat and noise management assembly 10. As shown in FIG. 8, the acoustic insulation layer 14 can be provided with a scrim layer 24 including scrim fibers 26. In another example, the heat reflective material 16 can be applied to the scrim layer 24 to form a heat and noise management assembly 27. The scrim fibers 26 in the scrim layer 24 can be woven or non-woven, and can be bound together with a thermoplastic or thermoset binder. The scrim fibers 26 can be arranged so that the scrim layer 24 includes a porous body capable of allowing sound to enter the body and be absorbed therein and/or passed to the acoustic absorbing layer 14.

The scrim layer 24 can be provided to protect the underlying acoustic absorbing layer 14 from contamination such as solid particles or liquids such as oil and water. The scrim layer 24 can include one or more non-woven fiber material, including but not limited to, polypropylene, polyester, rayon, nylon, and mixtures thereof. Additives, including but not limited to, a flame retarding additive, oil repellants, water repellants, biocides, and mixtures thereof can further be added to the resin prior to, during, or after formation of the scrim layer 24. The scrim layer 24 may be mechanically treated before or after application of the heat reflective material 16. In a non-limiting example, the scrim layer 24 can be needle-punched.

A heat and noise management assembly 10, 27 can be positioned so that the heat reflective material 16 is between the acoustic absorbing layer 14 and the engine of the vehicle. The heat reflective material 16 can be arranged to: 1) reflect heat generated by the engine away from the passenger compartment of the vehicle, and 2) maintain or otherwise define a plurality of channels 28 through the heat reflective material 16 to allow acoustic energy generated by the engine to pass though the channels 28 and onto the pathways 20 of the acoustic absorbing layer 14 or into the body of the scrim layer 24. One exemplary embodiment of the heat reflective material 16 is illustrated schematically in perspective view in FIG. 9 and in cross-sectional view in FIG. 10. The heat reflective material 16 can include a plurality of heat reflecting additives 30 dispersed in a polymer material 32. When heat and acoustic energy generated by the engine encounters the heat reflective material 16, the heat reflecting additives 30 can be arranged to reflect heat away from the passenger compartment, and the channels 28 allow acoustic energy to pass through the channels 28 and into the scrim layer 24 and/or the acoustic absorbing layer 14.

The heat reflecting additives 30 can be particles that reflect infrared energy and are encapsulated by the polymer material 32. In one example, the heat reflecting additives 30 are aluminum flakes that are generally lenticular in shape and are approximately 5 micrometers to approximately 25 micrometers in size. In another example, the heat reflecting additives 30 are approximately 10 micrometers to approximately 18 micrometers in size. In other examples, heat reflecting additives 30 can comprise particles other than aluminum and ceramics. In addition to being lenticular in shape, the heat reflecting additives 30 can be spherical, disk-shaped, irregularly-shaped, or any other suitable arrangement. The concentration of heat reflecting additives 30 added to the polymer material 32 can be arranged to provide the appropriate amount of heat reflection, where a greater concentration of heat reflecting additive 30 providing a greater amount of heat reflection.

The polymer material 32 can be a variety of suitable materials. For example, the polymer material 32 can be polyurethane, polyisoprene, polybutadiene, polyisobutylene, poly (styrene-butadiene-styrene), neoprene, hydrogenated acrylonitrile-butadiene rubber (HNBR), ethylene acrylic, silicone, fluoropolymers, polyethylene, phenolic, and ethylene propylene copolymer and terpolymer, as well as functionalized or modified versions thereof, and other suitable materials. The polymer material 32 can be comprised of a single monomer or polymer or can be a copolymer or otherwise of blend of polymers. The polymer material 32 can also be a material with thermoplastic properties or thermoset properties. The polymer material 32 can be formed using a solvent such as, for example, a blend of methyl isobutyl ketone and ethyl alcohol. In another example, the polymer material 32 can be formed from an aqueous solution of a polyurethane based polymer. The polymer material 32 can also be formed from a non-aqueous solution. Heat reflective additives 30 can be added to the polymer material when it is being formed using solvents, an aqueous solution, or a non-aqueous solution. In another example, additional additives can be added to either an aqueous or non-aqueous solution of the polymer material 32. Additive examples include, but are not limited to, flame retarding additive, oil repellants, water repellants, biocides, and mixtures thereof.

The heat reflective material 16 including the polymer material 32 and the heat reflecting additives 30 can be applied to the acoustic absorbing layer 14 in a variety of methods. For example, the heat reflective material 16 can be applied using spraying, rolling, painting, brushing, printing, and so on. In one example, a solution of the polymer material 32 is formed and heat reflective additives 30 are dispersed in the solution through mixing or other dispersion methods. The solution can then be applied to the acoustic absorbing layer 14 or scrim layer 24 by methods described herein and the solution can be allowed to solidify and form the heat reflective material 16. In one example, the polymer material 32 and heat reflecting additives 30 can be arranged to control the concentration and size of the channels 28 and the distribution of the heat reflective additives 30 in the polymer material 32.

In a non-limiting example, the polymer material 32 can be prepared in an aqueous form. Heat reflective additives can be added to the polymer material. The mixture of the polymer material 32 and the heat reflective additives 30 can be sprayed onto the acoustic absorbing layer 14 or the scrim layer 24 to form the heat reflective material 16 on the acoustic absorbing layer 14 or the scrim layer 24. The heat reflective material 16 can be arranged so that once the heat reflective material 16 is applied by spraying, the heat reflective material 16 can maintain a drop-like configuration as the heat reflective material forms into a layer. In another non-limiting example, the heat reflective material 16 can be arranged so that once the heat reflective material 16 is applied by spraying, the heat reflective material 16 wets-out as it contacts the acoustic absorbing layer 14 or the scrim layer 24, allowing the heat reflective material 16 to flow along the fibers (18 or 26) to penetrate deeper into the acoustic absorbing layer 14 or the scrim layer 24. In a non-limiting example, the heat reflective material 16 can be mechanically treated after forming by needle-punching the heat reflective material 16.

It will be understood that heat and noise management assemblies 10, 27 can be arranged so that acoustic energy can travel through the channels 28 of the heat reflective material 16 and into the plurality of fibers 26 that form the body of the scrim layer 24 and/or the plurality of fibers 18 that form the acoustic absorbing layer 14. Thus, the heat reflective layer 14 can provide protection from heat and other such radiant energy while also allowing for acoustic energy to be absorbed by the acoustic absorbing layer 14 and/or the scrim layer 24.

The solution can be applied such that the thickness of the heat reflective material 16 and the penetration of the heat reflective material 16 into the acoustic absorbing layer 14 or scrim layer 24 are controlled. In one non-limiting example, the solution is applied such that the heat reflective material 16 is between about 25 micrometers to about 150 micrometers thick. When the polymer material 32 is applied to the acoustic absorbing layer 14 or scrim layer 24, the polymer material 32 can be arranged to flow into the fibrous network of the acoustic absorbing fibers 18 or the scrim fibers 26. In a non-limiting example, the heat reflective material 16 extends into the acoustic absorbing layer 14 or scrim layer 24 up to about 150 micrometers. In yet another non-limiting example, the heat reflective material 16 extends into the acoustic absorbing layer 14 or scrim layer 24 from about 10 microns to about 75 microns. In a further non-limiting example, the heat reflective material 16 extends into the acoustic absorbing layer 14 or scrim layer 24 up to about 25 microns.

Properties of the solution of the polymer material 32 can be arranged to facilitate the bonding of the heat reflective material 16 to the acoustic absorbing layer 14 or scrim layer 24. For example, how quickly the polymer material 32 crosslinks and solidifies and the viscosity of the solution can be arranged to facilitate bonding of the heat reflective material 16 to the individual fibers 18, 26 of the acoustic absorbing layer 14 or scrim layer 24. As described above, the heat reflective material 16 can be arranged so that once the heat reflective material 16 is applied to the acoustic absorbing layer 14 or scrim layer 24, the heat reflective material 16 can form droplets or wets-out as it contacts the acoustic absorbing layer 14 or the scrim layer 24. Such arrangements can determine the penetration of the heat reflective material 16 into the acoustic absorbing layer 14 or scrim layer 24 and facilitate the bonding of the heat reflective material 16 to the acoustic absorbing layer 14 or scrim layer 24.

EXAMPLES

The following examples were prepared to illustrate the present disclosure without, however, limiting it.

Figure 11:
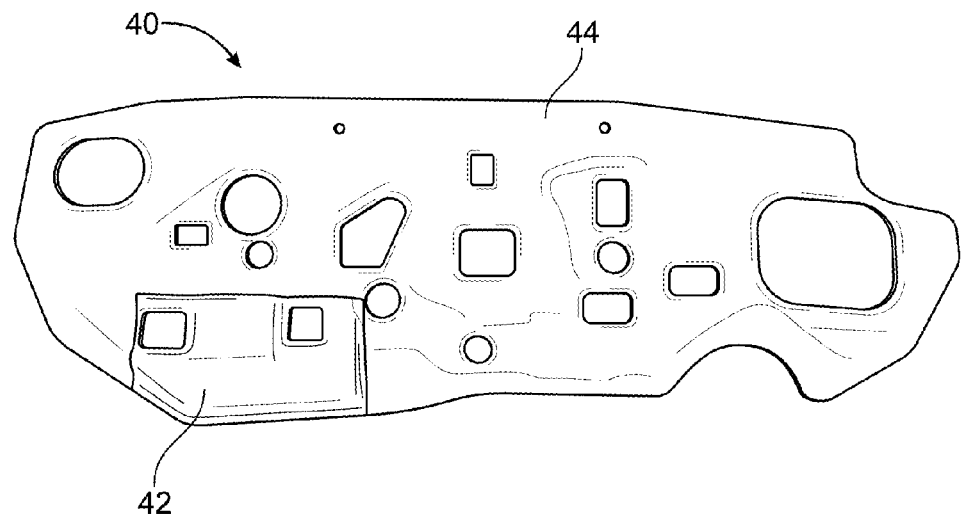
FIG. 11 is a schematic view of a prior art acoustic insulator partially covered by a foil patch.
Figure 12:
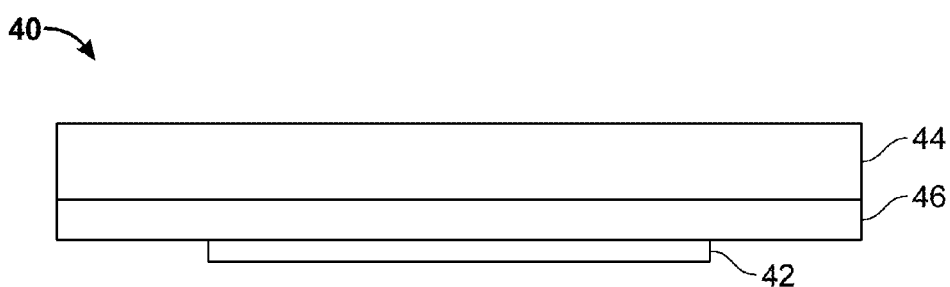
FIG. 12 is an elevational schematic view depicting the prior art acoustic insulator of FIG. 11.
Figure 13:
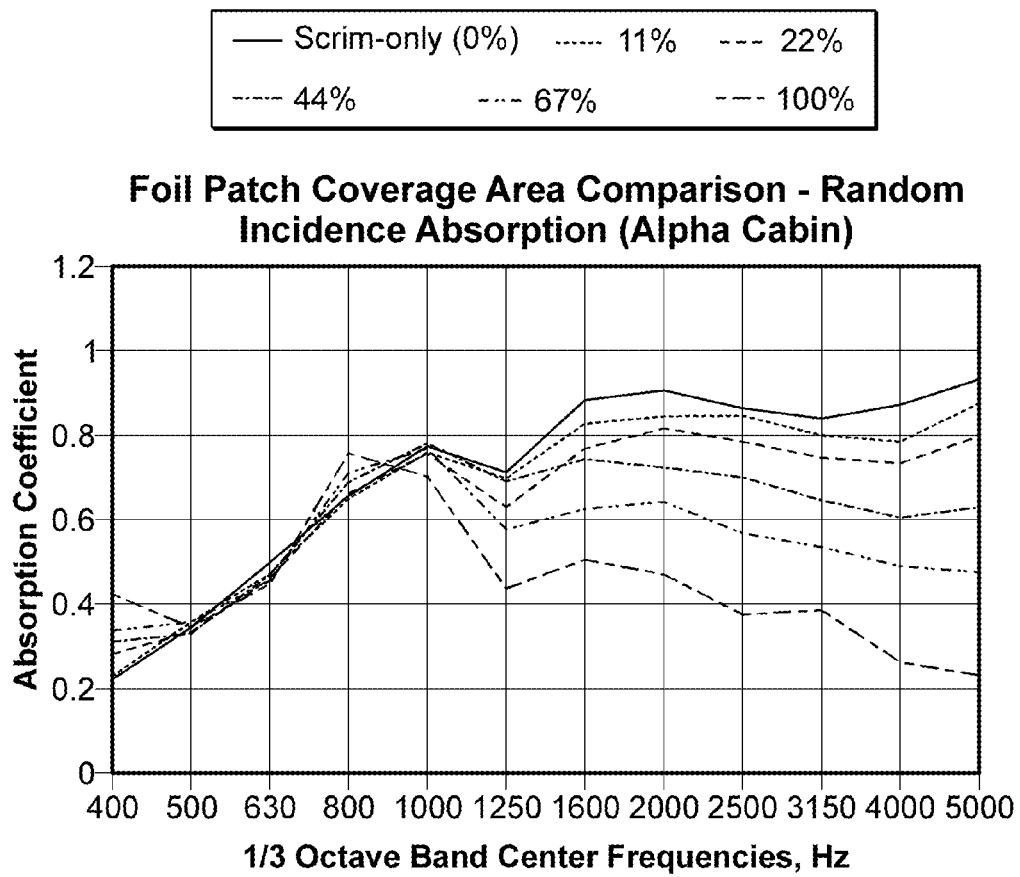
FIG. 13 is a chart illustrating the absorption coefficient of heat and noise management assemblies as a function of 1/3 octave band center frequencies.

A comparative example of a conventional heat and noise management assembly 40 is illustrated in FIG. 11. The heat and noise management assembly 40 of FIG. 11 includes a foil patch 42 secured to at least a portion of an acoustic insulator 44. The foil patch 42 is arranged to reflect heat generated by the engine, and the acoustic insulator 44 can be arranged to absorb noise and other acoustic energy generated by the engine. The heat and noise management assembly 40 of FIG. 11 is schematically illustrated in cross-section in FIG. 12. In addition to the acoustic insulator 44 and the foil patch 42, a scrim layer 46 can be positioned between the acoustic insulator 44 and the foil patch 42. As illustrated in FIGS. 11 and 12, the foil patch 42 can be arranged to cover a portion of the surface area of the scrim layer 46. In one alternative, the foil patch 42 can be arranged to cover substantially the entire surface area of the scrim layer 46. FIG. 13 is a chart illustrating the absorption coefficient of the conventional foil patch heat and noise management assemblies 40 as a function of ⅓ octave band center frequencies (in hertz) for arrangements where the foil patch 42 covers the following surface area of the scrim 46: 0%, 11%, 22%, 44%, 67% and 100%.

Figure 14:
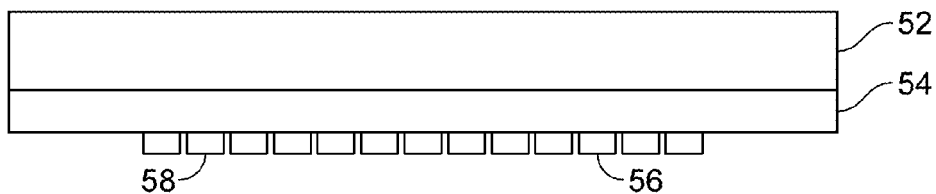
FIG. 14 is an elevational schematic view depicting a prior art heat and noise management assembly.
Figure 15:
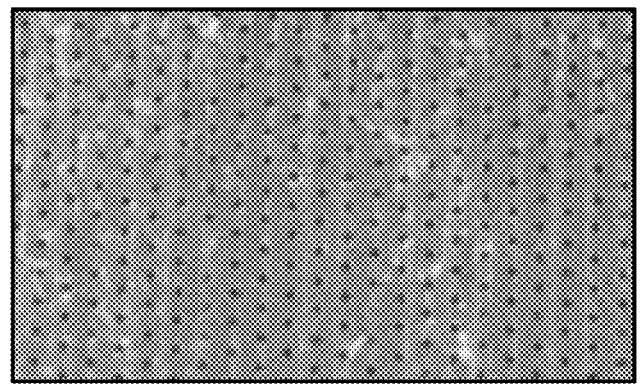
FIG. 15 is a photograph of a perforated foil patch.

Another comparative example of a conventional heat and noise management assembly 50 is schematically illustrated in FIG. 14. The heat and noise management assembly 50 includes an acoustic insulator 52, a scrim 54, and a perforated foil patch 56 (also shown in FIG. 15) secured to a scrim 54. The foil patch 56 is arranged to reflect heat generated by the engine, and the scrim 54 and acoustic insulator 52 is arranged to absorb noise and other acoustic energy generated by the engine. Perforations 58 in the perforated foil patch 56 pass all the way though the perforated foil patch 56. Such an arrangement can allow some acoustic energy to pass through the perforated foil patch 56.

Figure 16:
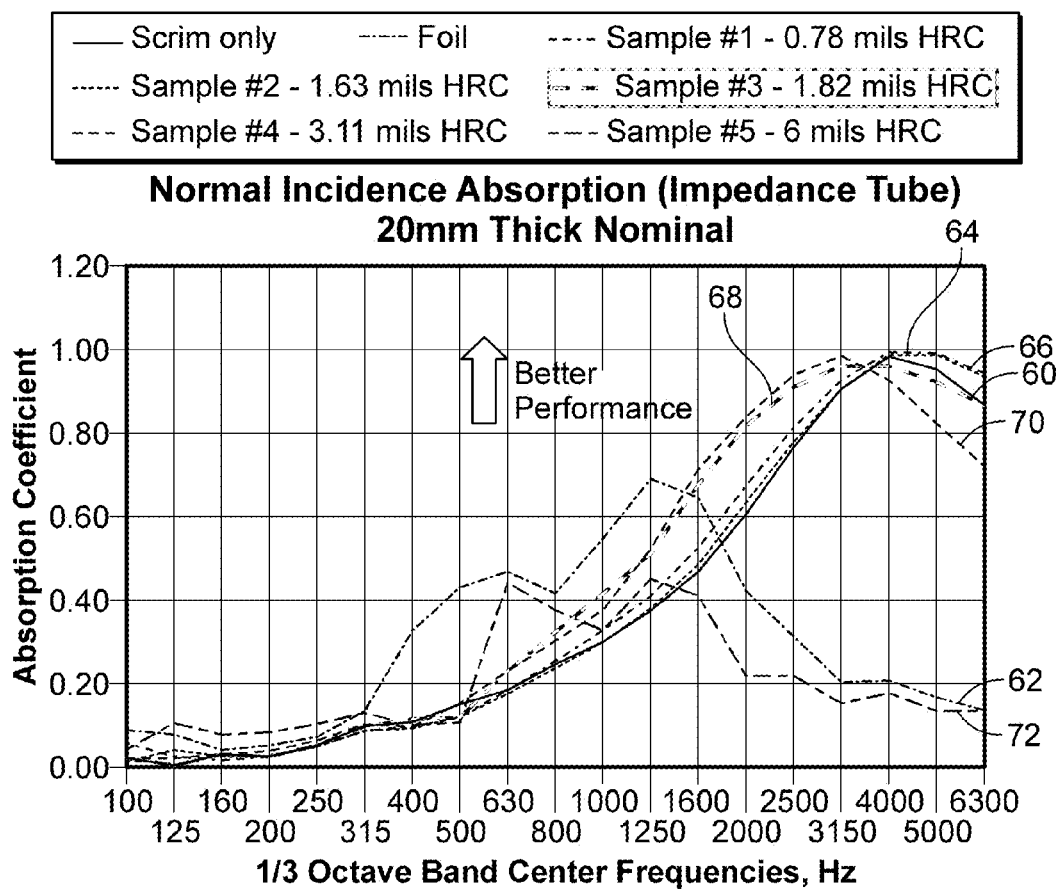
FIG. 16 is a chart illustrating the absorption coefficient of heat and noise management assemblies as a function of 1/3 octave band center frequencies.
Figure 17:
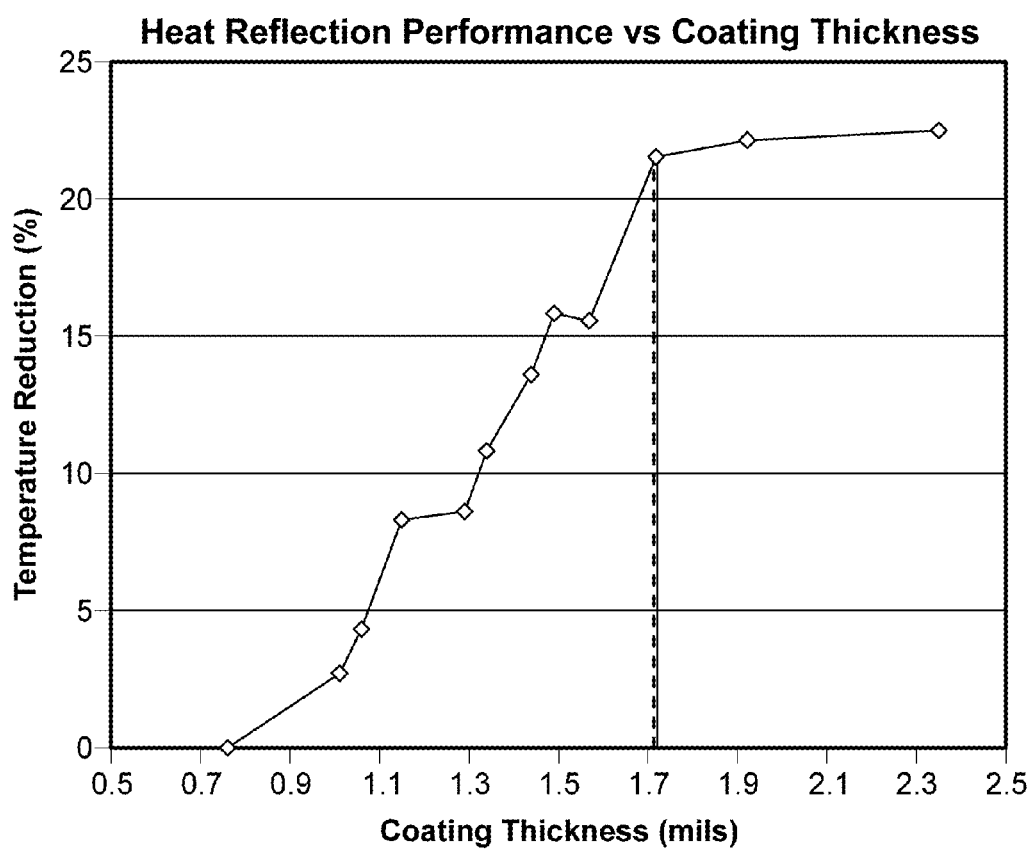
FIG. 17 is a chart illustrating temperature reduction as a function of the thickness of heat reflective coating.

FIG. 16 is a chart illustrating the absorption coefficient of heat and noise management assemblies as a function of ⅓ octave band center frequencies (in hertz) for various arrangements, including: the conventional insulator and scrim only (identified as reference no. 60); the conventional foil patch, scrim and insulator (identified as reference no. 62); insulator, scrim, and 0.78 mils (i.e., about 20 micrometers) heat reflective coating in accordance with the present disclosure (identified as reference no. 64); insulator, scrim, and 1.63 mils (i.e., about 41 micrometers) heat reflective coating in accordance with the present disclosure (identified as reference no. 66); insulator, scrim, and 1.82 mils (i.e., about 46 micrometers) heat reflective coating in accordance with the present disclosure (identified as reference no. 68); insulator, scrim, and 3.11 mils (i.e., about 79 micrometers) heat reflective coating in accordance with the present disclosure (identified as reference no. 70); and insulator, scrim, and 6 mils (i.e., about 152 micrometers) heat reflective coating in accordance with the present disclosure (identified as reference no. 72). FIG. 17 is a chart illustrating temperature reduction percentage as a function of thickness of a heat reflective coating applied to a scrim in a heat and noise management assembly. Based on the examples illustrated in the charts of FIGS. 16 and 17, a heat reflective coating with a thickness of about 43 to 46 micrometers performs well in both reflecting heat and in absorbing acoustic energy. It will also be understood by those of ordinary skill in the art upon reading and understand this specification that other thicknesses of heat reflective coating can also perform well or adequately with regard to reflecting heat and absorbing acoustic energy.

As previously discussed, the heat reflective coating can be applied as an aqueous solution to coat an insulator or a scrim. A flame retarding agent can be added to the heat reflective coating to, for example, meet UL94-V0 standards. The heat reflective coating can also be arranged to resist dissolving, thinning or diminishing when in contact with chemical agents such as, for example, radiator fluid, brake fluid, window washer fluid, engine oil, sulfuric acid, salt, or water.

Figure 18:
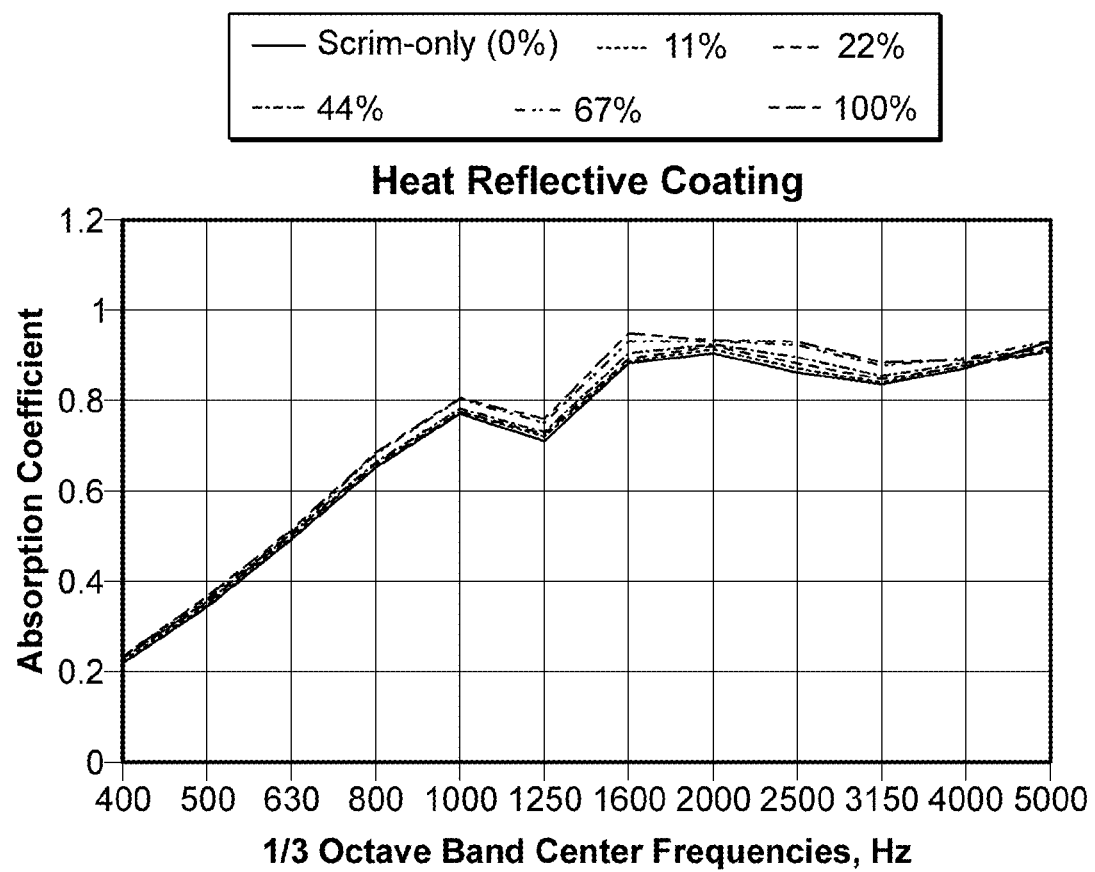
FIG. 18 is a chart illustrating the absorption coefficient of heat and noise management assemblies as a function of 1/3 octave band center frequencies.
Figure 19:
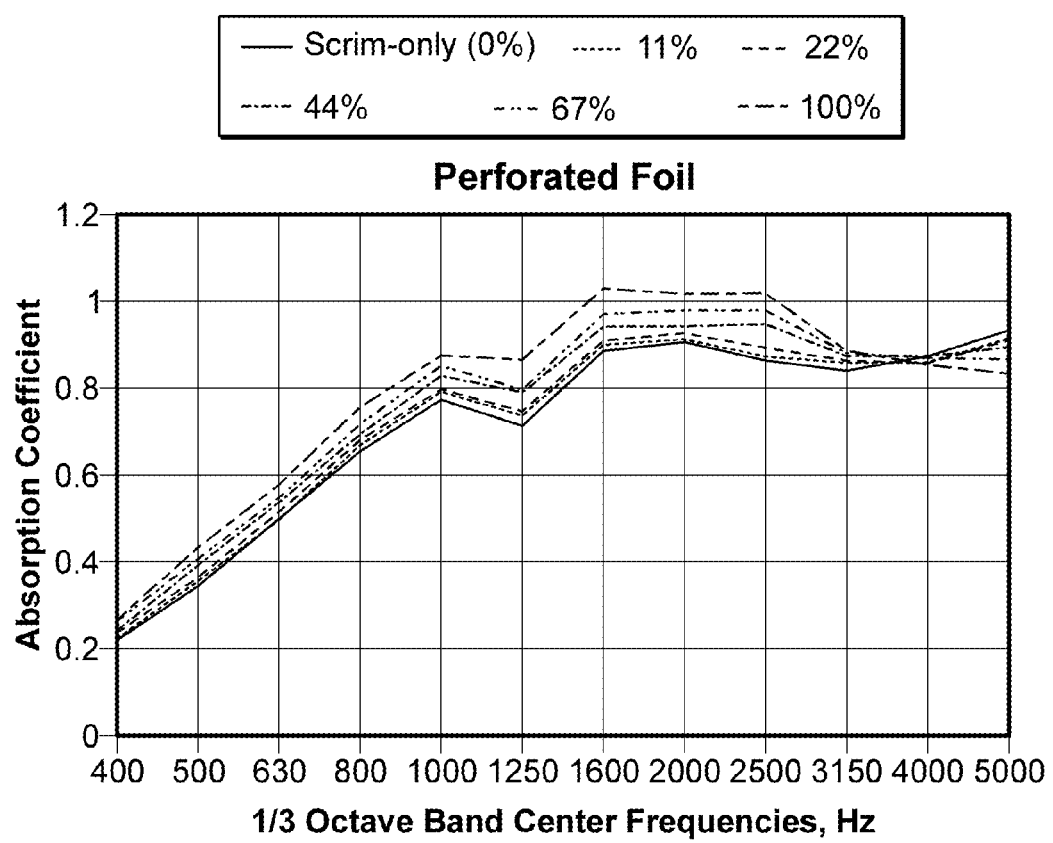
FIG. 19 is a chart illustrating the absorption coefficient of heat and noise management assemblies as a function of 1/3 octave band center frequencies.

FIG. 18 is a chart illustrating the absorption coefficient of heat and noise management assemblies as a function of ⅓ octave band center frequencies (in hertz) for arrangements where the heat reflective coating in accordance with the present disclosure covers the following surface area of the scrim: 0%, 11%, 22%, 44%, 67% and 100%. FIG. 19 is a chart illustrating the absorption coefficient of heat and noise management assemblies as a function of ⅓ octave band center frequencies (in hertz) for arrangements where a conventional perforated foil patch covers the following surface area of the scrim: 0%, 11%, 22%, 44%, 67% and 100%.

Figure 20:
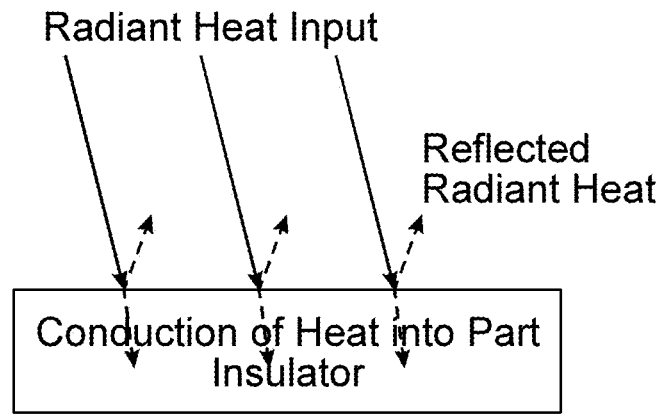
FIG. 20 is a schematic illustration of an uncovered insulator exposed to radiant heat.
Figure 21:
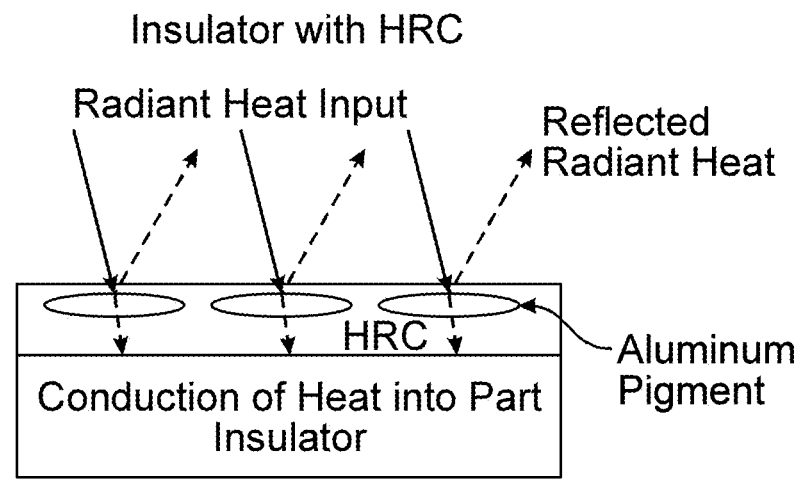
FIG. 21 is a schematic illustration of an insulator coated with a heat reflective coating exposed to radiant heat.
Figure 22:
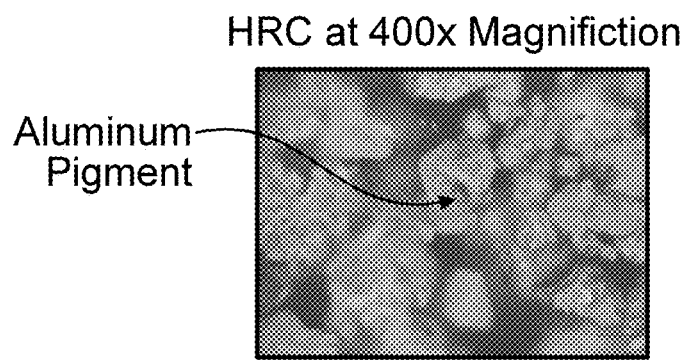
FIG. 22 is a photograph of a heat reflective coating.

As previously discussed, the heat reflective material 16 of the present disclosure includes heat reflecting additives such as, for example, aluminum pigments. When an insulator is exposed directly to a source of heat, much of the heat is conducted directly into the insulator (as shown in FIG. 20). However, when the heat reflective coating is applied to an insulator (as shown in FIG. 21), much of the heat is reflected away from the insulator and such an arrangement can limit the amount of heat conducted into the insulator. An example of aluminum pigment in a heat reflective material 16 is shown in FIG. 22.

Figure 23:
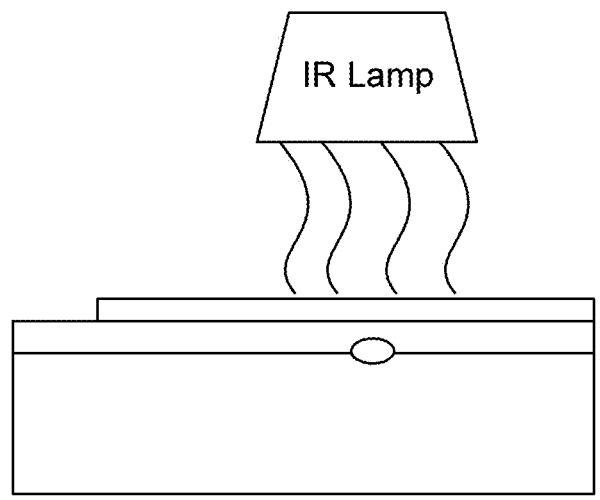
FIG. 23 is a schematic illustration depicting a test apparatus.
Figure 24:
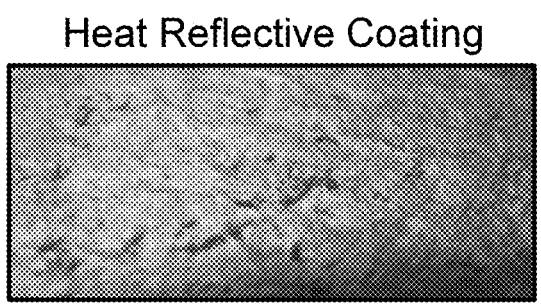
FIG. 24 is a photograph of heat reflective coating.
Figure 25:
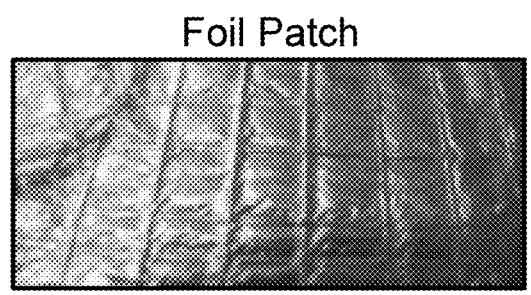
FIG. 25 is a photograph of a foil patch.
Figure 26:
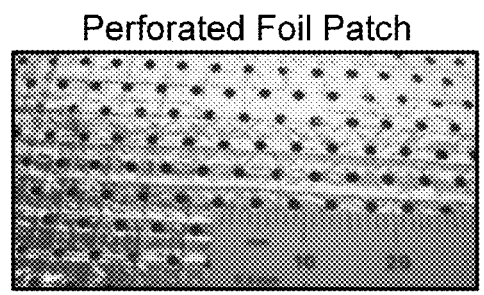
FIG. 26 is a photograph of a perforated foil patch.
Figure 27:
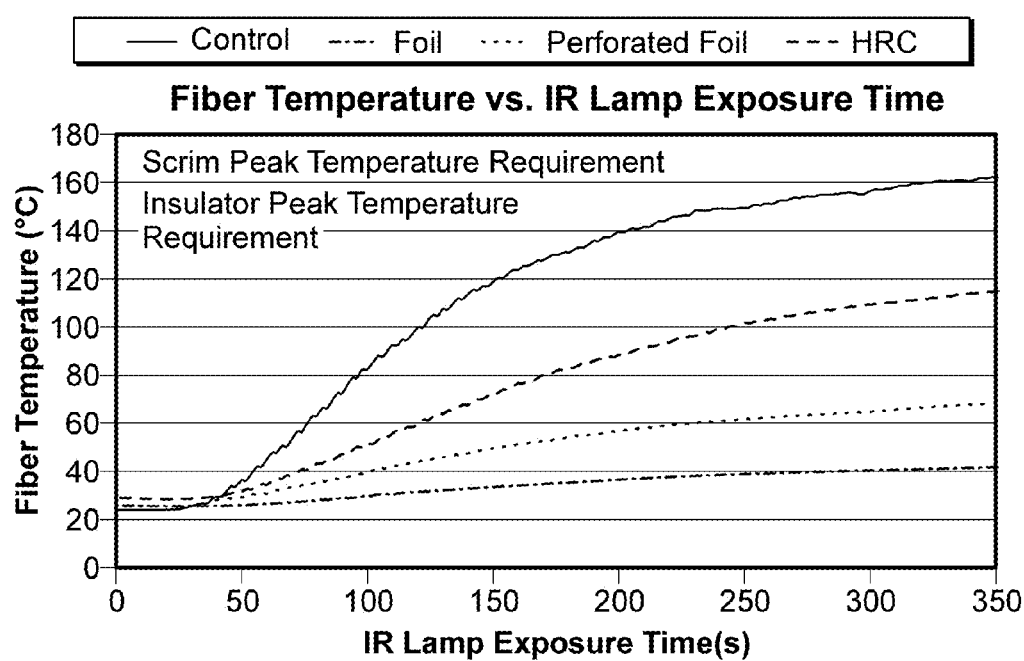
FIG. 27 is a chart illustrating the temperature of an insulator as a function of exposure time to infrared radiation.

Comparative experiments were conducted to determine the heat transferred to an acoustic insulator when a heat reflective material of the present disclosure, a conventional foil patch, and a conventional perforated foil patch are positioned between the heat source and the acoustic insulator. FIG. 23 illustrates the experimental set-up of such testing. A thermocouple was placed between the acoustic insulator and the scrim. A heat reflective material of the present disclosure (see FIG. 24), a conventional foil patch (see FIG. 25) or a conventional perforated foil patch (see FIG. 26) was secured to the scrim. An infrared lamp was directed to the surface of the heat reflective material, foil patch, or perforated foil patch for 350 seconds, and the temperature of the thermocouple was recorded over the 350 seconds. The results of such testing are shown in a chart in FIG. 27. The control sample is a scrim and insulator without any additional layers. As is shown in the chart of FIG. 27, the heat reflective coating, foil patch, and perforated foil patch all outperform the control sample.

Figure 28:
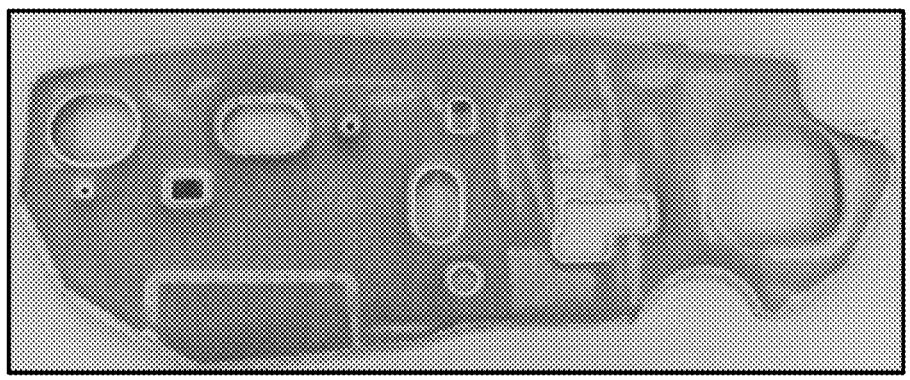
FIG. 28 is photograph of an insulator coated with a heat reflective coating.
Figure 29:
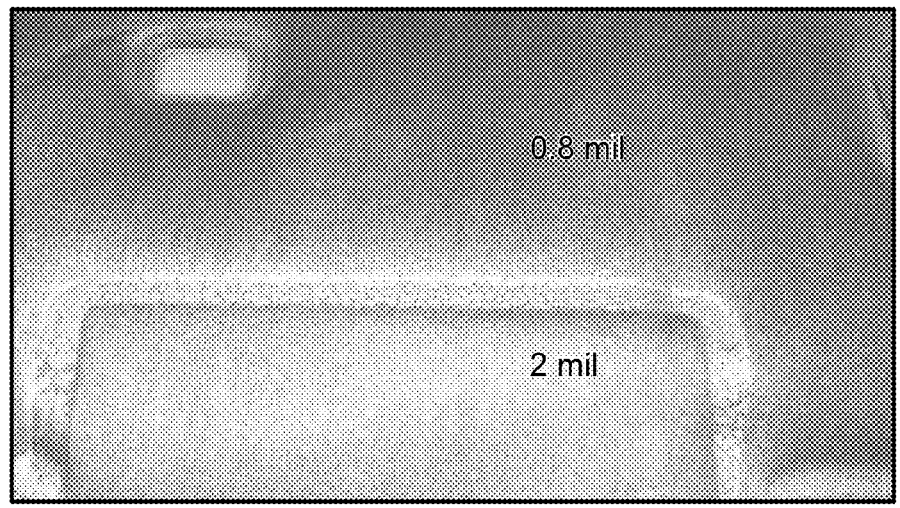
FIG. 29 is photograph of an insulator coated with a heat reflective coating.

An example of a dash outer acoustic insulator 100% deposited with a heat reflective material is shown in FIG. 28. The heat reflective material can be applied to penetrate different thicknesses within the same insulating component. For example, as shown in FIG. 29, one area can be deposited at 20 micrometers depth of penetration and another area can be deposited with 51 micrometers of penetration. The selection of penetration can be chosen to adjust for the amount of heat directed to different portions of an insulator, to minimize costs, or to maximize performance.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of this disclosure is, of course, not limited to the examples or embodiments set forth herein, but can be employed in any number of applications and equivalent devices by those of ordinary skill in the art. Rather it is hereby intended the scope of this disclosure be defined by the claims appended hereto.

What is claimed is:

1. An assembly for managing heat and acoustic energy generated by an engine comprising:
   an acoustic absorbing layer; and
   a heat reflective coating secured to the acoustic absorbing layer, the heat reflective coating comprising:
      a polymeric material defining a plurality of channels passing through the polymeric material; and
      a plurality of heat reflecting additives deposited in the polymeric material.

2. The assembly of claim 1, wherein the heat reflective coating is positioned between the acoustic absorbing layer and an engine.

3. The assembly of claim 2, wherein the heat reflective coating provides for a portion of acoustic energy generated by an engine to pass through the heat reflective coating.

4. The assembly of claim 2, wherein the heat reflective coating provides for a portion of heat generated by an engine to be redirected away from the heat reflective coating.

5. The assembly of claim 2, wherein the heat reflecting additives are metal flakes.

6. The assembly of claim 2, wherein the heat reflecting additives are lenticularly shaped aluminum flakes.

7. The assembly of claim 6, wherein the heat reflecting additives are between about 10 micrometers and about 18 micrometers in diameter.

8. The assembly of claim 2, wherein the heat reflecting additives comprises a ceramic.

9. The assembly of claim 2, wherein the polymeric material is a thermoplastic.

10. The assembly of claim 2, wherein the assembly further includes a flame retardant.

11. The assembly of claim 2, wherein the heat reflective coating is formed with a thickness of between about 25 micrometers to about 150 micrometers.

12. An insulation assembly comprising:
   an acoustic insulator having a first side and a second side, the acoustic insulator comprising non-woven fibers defining tortuous pathways therein, the tortuous pathways being in fluid communication with a plurality of openings on the first side; and
   a heat reflective material secured to at least a portion of the first side of the acoustic insulator without sealing all openings of the plurality of openings.

13. The insulation assembly of claim 12, wherein the heat reflective material comprises a resin and a heat reflective material.

14. The insulation assembly of claim 13, wherein the heat reflective material is present inside the acoustic insulator at least about 25 micrometers from the first side.

15. The insulation assembly of claim 12, further comprising a non-woven scrim defining the first side of the acoustic insulator.

* * * * *